United States Patent
Wright et al.

(10) Patent No.: US 9,538,240 B2
(45) Date of Patent: Jan. 3, 2017

(54) METHODS AND APPARATUS FOR DETECTING SPACE-SHIFTED MEDIA ASSOCIATED WITH A DIGITAL RECORDING/PLAYBACK DEVICE

(71) Applicant: The Nielsen Company (US), LLC, New York, NY (US)

(72) Inventors: David Howell Wright, Safety Harbor, FL (US); David James Croy, Palm Harbor, FL (US); Arun Ramaswamy, Tampa, FL (US); Jan Besehanic, Tampa, FL (US); Brian Mello, Valrico, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 119 days.

(21) Appl. No.: 14/139,029

(22) Filed: Dec. 23, 2013

(65) Prior Publication Data
US 2014/0173645 A1  Jun. 19, 2014

Related U.S. Application Data

(63) Continuation of application No. 11/750,881, filed on May 18, 2007, now Pat. No. 8,682,137, which is a
(Continued)

(51) Int. Cl.
*H04N 9/80* (2006.01)
*H04N 21/442* (2011.01)
(Continued)

(52) U.S. Cl.
CPC ........... *H04N 21/442* (2013.01); *H04H 60/31* (2013.01); *H04H 60/40* (2013.01); *H04N 5/765* (2013.01);
(Continued)

(58) Field of Classification Search
CPC ...... H04N 21/442; H04N 60/31; H04N 60/37; H04N 60/40; H04N 5/4401; H04N 5/765; H04N 5/775; H04N 5/781; H04N 5/85; H04N 5/907; H04N 7/163; H04N 21/4135; H04N 21/4147; H04N 21/4333; H04N 21/4334; H04N 21/43615; H04N 21/44204
See application file for complete search history.

(56) References Cited

U.S. PATENT DOCUMENTS 5,675,738 A * 10/1997 Suzuki ............... H04N 7/17318
348/E7.071
5,844,636 A    12/1998 Joseph et al.
(Continued)

FOREIGN PATENT DOCUMENTS

WO     0237246     5/2002

OTHER PUBLICATIONS

Mexican Patent Office, English translation of Mexican Office Action, issued in connection with Application No. MX/a/2007/005981, Sep. 18, 2009, 5 pages.
(Continued)

*Primary Examiner* — Tat Chio
(74) *Attorney, Agent, or Firm* — Hanley, Flight and Zimmerman, LLC.

(57) ABSTRACT

Methods and apparatus for detecting space-shifted media content associated with a digital recording/playback device are disclosed. An example method for detecting space-shifted media content includes detecting, at a router, a data packet transmitted from a first media device of a home network to a second media device of the home network; and determining, at the router, that media associated with the data packet is space-shifted when the data packet comprises at least one of media data or command data.

20 Claims, 7 Drawing Sheets

Related U.S. Application Data continuation of application No. PCT/US2005/042108, filed on Nov. 21, 2005.

(60) Provisional application No. 60/629,529, filed on Nov. 19, 2004.

(51) Int. Cl.

| | | |
|---|---|---|
| *H04H 60/31* | (2008.01) | |
| *H04H 60/40* | (2008.01) | |
| *H04N 5/765* | (2006.01) | |
| *H04N 7/16* | (2011.01) | |
| *H04N 21/41* | (2011.01) | |
| *H04N 21/4147* | (2011.01) | |
| *H04N 21/433* | (2011.01) | |
| *H04N 21/436* | (2011.01) | |
| H04H 60/37 | (2008.01) | |
| H04N 5/44 | (2011.01) | |
| H04N 5/775 | (2006.01) | |
| H04N 5/781 | (2006.01) | |
| H04N 5/85 | (2006.01) | |
| H04N 5/907 | (2006.01) | |

(52) U.S. Cl.
CPC .......... *H04N 7/163* (2013.01); *H04N 21/4135* (2013.01); *H04N 21/4147* (2013.01); *H04N 21/4333* (2013.01); *H04N 21/4334* (2013.01); *H04N 21/43615* (2013.01); *H04N 21/44204* (2013.01); *H04H 60/37* (2013.01); *H04N 5/4401* (2013.01); *H04N 5/775* (2013.01); *H04N 5/781* (2013.01); *H04N 5/85* (2013.01); *H04N 5/907* (2013.01)

(56) References Cited

U.S. PATENT DOCUMENTS

| | | | |
|---|---|---|---|
| 6,314,111 B1* | 11/2001 | Nandikonda | H04L 29/12066 348/E5.005 |
| 6,389,403 B1 | 5/2002 | Dorak, Jr. | |
| 6,779,198 B1 | 8/2004 | Morinaga et al. | |
| 6,965,975 B2* | 11/2005 | Jeong | G11B 20/00086 380/201 |
| 8,682,137 B2 | 3/2014 | Wright et al. | |
| 2002/0059633 A1 | 5/2002 | Harkness et al. | |
| 2002/0118680 A1* | 8/2002 | Lee | H04L 29/06027 370/389 |
| 2003/0005453 A1* | 1/2003 | Rodriguez | H04N 7/17318 725/87 |
| 2004/0107356 A1 | 6/2004 | Shamoon et al. | |
| 2004/0181818 A1 | 9/2004 | Heyner et al. | |
| 2005/0207575 A1* | 9/2005 | Okamoto | G11B 20/00086 380/201 |
| 2008/0056675 A1 | 3/2008 | Wright et al. | |

OTHER PUBLICATIONS

European Patent Office, "Extended European Search Report," issued in connection with European patent application No. 05826647.9, Oct. 2, 2012, 7 pages.

European Patent Office, "Communication pursuant to Article 94(3) EPC," issued in connection with European patent application No. 05826647.9, Sep. 17, 2013, 3 pages.

International Bureau, "International Preliminary Report on Patentability", issued in connection with International patent application No. PCT/US05/42108, dated Jul. 26, 2007, 4 pages.

International Bureau, "International Preliminary Report on Patentability", issued in connection with International patent application No. PCT/US2005/042108, mailed on May 31, 2007, 8 pages.

International Bureau,"Search Report and Written Opinion", issued in connection with International patent application No. PCT/US2005/042108, mailed on Aug. 17, 2006, 8 pages.

The United States Patent and Trademark Office,"Non-Final Office action", issued in connection with U.S. Appl. No. 11/750,881, mailed on Apr. 18, 2012, 35 pages.

The United States Patent and Trademark Office,"Final Office action", issued in connection with U.S. Appl. No. 11/750,881, mailed on Jun. 4, 2013, 43 pages.

The United States Patent and Trademark Office,"Notice of Allowance", issued in connection with U.S. Appl. No. 11/750,881, mailed on Oct. 18, 2013, 28 pages.

European Patent Office, "Communication Pursuant to Article 94(3) EPC," issued in connection with European Patent Application No. 05826647.9, mailed Dec. 23, 2014 (9 pages).

* cited by examiner

METHODS AND APPARATUS FOR DETECTING SPACE-SHIFTED MEDIA ASSOCIATED WITH A DIGITAL RECORDING/PLAYBACK DEVICE

RELATED APPLICATION

This patent arises from a continuation of U.S. patent application Ser. No. 11/750,881, entitled "Methods and Apparatus for Detecting Space-Shifted Media Associated with a Digital Recording/Playback Device," which was filed on May 18, 2007 which is a continuation of International Patent Application No. PCT/US2005/042108, entitled "Methods and Apparatus for Detecting Space-Shifted Media Content Associated with a Digital Recording/Playback Device", which was filed on Nov. 21, 2005, and which claims the benefit of the filing date of U.S. Provisional Patent Application Ser. No. 60/629,529, entitled "Methods and Apparatus For Detecting Space-Shifted Media Content Associated with a Digital Recording/Playback Device" filed on Nov. 19, 2004. Priorities for U.S. application Ser. No. 11/750,881, International Patent Serial No. PCT/US2005/042108, U.S. Provisional Application Ser. No. 60/629,529 are hereby claimed. The entire disclosures of U.S. application Ser. No. 11/750,881, International Patent Serial No. PCT/US2005/042108, U.S. Provisional Application Ser. No. 60/629,529 are incorporated by reference herein in their entirety.

TECHNICAL FIELD

The present disclosure pertains to identifying media content and, more particularly, to methods and apparatus for detecting space-shifted media content associated with a digital recording/playback device.

BACKGROUND

Companies that rely on broadcast video and/or audio programs for revenue, such as advertisers, television networks and content providers, desire to know the size and demographic composition of the audiences that consume their programs. Audience measurement companies typically address this need by measuring the demographic composition of a set of statistically selected households and the program consumption habits of the members of those households. For example, audience measurement companies may collect viewing data associated with a selected household by monitoring the audio/video content presented via the television(s) within the household and by identifying which household members consumed (e.g., viewed, listened to, etc.) that content.

Traditionally, broadcast programs have been consumed via the media delivery device at which the broadcast programs are received. However, more recently, recording devices, such as audio cassette players, video cassette recorders (VCRs), set top boxes (STBs), digital video recorders (DVRs), and personal video recorders (PVRs) such as SonicBlue's ReplayTV®, TiVo®, home media networks (e.g., media center PCs), and other devices that permit content to be recorded and replayed in accordance with the desires of individual audience members, have become commonplace. These devices have significantly increased the ability of audience members to space-shift the consumption of broadcast programs (i.e., to record a program at the time of broadcast and consume that same program at a later time and at a location different than the location at which the program was recorded). The ability to space-shift media content has provided media consumers with enhanced power to record programs and distribute the programs to different locations within a monitored site (e.g., a household, a restaurant, a store, etc.)

DETAILED DESCRIPTION

In general, the example apparatus and methods described herein may be used to facilitate audience measurement in a household media system. More specifically, the example apparatus and methods described herein enable the detection and monitoring of space-shifted media content in a household media system. Space-shifted media content is content that has been transferred via, for example, a network (or any other means) from one location (e.g., a room, a viewing space, etc.) to another location.

In one example, a metering device is provided in each location in the household where media content may be consumed. The metering device may detect identifying data (e.g., video codes, audio codes, audio watermarks, video watermarks, etc.) associated with the media content that is consumed and may determine if the media content is space-shifted media content. The metering device may transmit information about the media content to a central server for analysis.

In addition to or as an alternative to the previous example, a space-shift detector may be used to monitor media content that is transmitted from one location to another. If the space-shift detector detects media content that is transmitted from one location to another, the space-shift detector may indicate that the content is space-shifted. The space-shift detector may additionally transmit information regarding the media to a central server for analysis.

In contrast to many known systems, the example apparatus and methods described herein may be used to determine when media content has been space-shifted. Although many known systems are capable of determining an original source of media content, these known systems are typically not capable of determining that media content has been space-shifted after the point that it was originally received at a household. By monitoring or determining whether media content has been space-shifted, the example apparatus and methods described herein may be used to provide more detailed information about how a consumer has transferred and viewed media content throughout a household.

Figure 1:
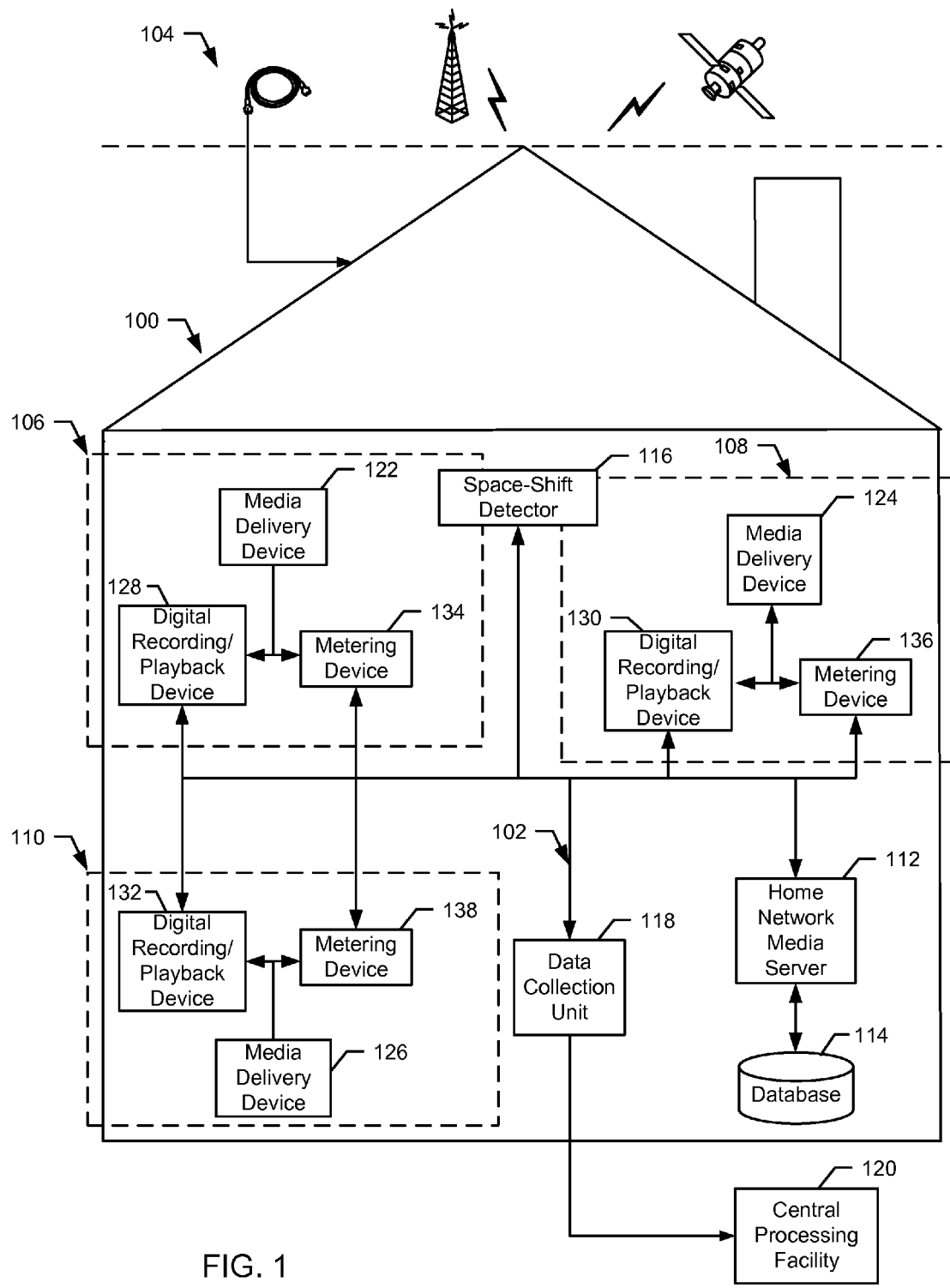
FIG. 1 is a block diagram of an example home network that may be used to space-shift media content.

FIG. 1 is a block diagram of an example household 100 containing a network 102 that may be used to space-shift media content. The example network 102 may be implemented as several components of hardware, each of which may be configured to perform one or more functions, may be implemented in software or firmware where one or more programs are used to perform the different functions, or may be implemented using a combination of hardware, firmware, and/or software. The example household 100 includes the network 102, communicative access to a plurality of broadcast information sources 104, content storage and viewing sites 106, 108 and 110, a home network media server 112, a home network storage database 114, a space-shift detector 116, a data collection unit 118, and communicative access to a central processing facility 120. The network 102 may be any type of network, such as the Internet, a LAN, a telephone network, a cable network, and/or a wireless network.

The broadcast information sources 104 collectively represent systems capable of providing media content from one or more different media sources. The media content provided by the broadcast information sources 104 may include, for example, broadcast content such as media content from a television service provider (e.g., a cable television service provider, a satellite television service provider, and/or a terrestrial television service provider), streaming or web content from a network such as the Internet, media content supplied by a local device such as, for example, a digital versatile disk (DVD) player, a video cassette recorder (VCR), etc. The media content may be in any known form such as a National Television Standards Committee (NTSC) television signal format, a phase alteration line (PAL) television signal format, a compressed digital format such as MPEG, etc.

The content storage and viewing sites 106, 108 and 110 are areas within the household 100 such as, for example, a living room, a bedroom, a kitchen, etc., within which members of the household 100 may consume media content. A person of ordinary skill in the art will readily appreciate that multiple content storage and viewing sites 106, 108 and 110 may be contained in the household. Each of the content storage and viewing sites 106, 108 and 110 includes at least one media delivery device 122, 124 and 126, a digital recording/playback device 128, 130 and 132, and a metering device 134, 136 and 138, respectively.

Each of the media delivery devices 122, 124 and 126 may be implemented using any device configured to receive media content from one or more of the broadcast information sources 104, the digital recording/playback devices 128, 130 and 132, the home network media server 112, and/or any other media content source. Each of the media delivery devices 122, 124 and 126 may be a television, a radio, a personal computer, a personal digital assistant (PDA) and/or any device capable of receiving media content and presenting (e.g., displaying, playing back, etc.) the received media content to one or more members of the household 100.

As used herein, the term "digital recording/playback device" is defined to include digital video recorders (DVRs), personal video recorders (PVRs), a computer with a television tuning card configured to capture television content, etc. The digital recording/playback devices 128, 130 and 132 are configured to receive media content from one or more of the broadcast information sources 104 and/or the home network media server 112 and are configured to record audio/video programs (e.g., television programming contained in the media content). The digital recording/playback devices 128, 130 and 132 may be configured to digitally record and/or store audio/video television programs in an internal storage device such as a hard drive and/or some other form of storage device such as, for example, flash memory and/or a compact disc (CD). In addition to recording television programming, the digital recording/playback devices 128, 130 and 132 may also be configured to perform time-shift tricks (e.g., pausing a program, fast-forwarding a program, rewinding a program, slow-motion viewing of a program, etc.). For example, a television viewer may decide to pause a program and to resume playback of the program at a later time.

In addition to time-shift tricks, each of the digital recording/playback devices 128, 130 and 132 is configured to space-shift media content via the network 102 to other ones of the digital recording/playback devices 128, 130 and 132 communicatively coupled to the network 102. In this manner, the digital recording/playback devices 128, 130 and 132 can deliver space-shifted media content to one or more of the media delivery devices 122, 124 and 126 in a format such as the NTSC television signal format, the PAL television signal format, a digital format such as MPEG, etc. For example, the digital recording/playback device 128 may record a television program and then transfer, transmit or otherwise convey via the network 102 the recorded television program information to the digital recording/playback device 130. The television program information may be space-shifted (e.g., moved, conveyed, transmitted, etc. from one location to another location) via the network 102 using any known network protocol such as, for example, IEEE 802.3, IEEE 802.11a/b/g/k/n/u, IEEE 1394, a file transfer protocol (FTP), etc. Alternatively, the digital recording/playback devices 128, 130 and 132 may convert the media content to analog signals or information (e.g., using QAM64, QAM256, NTSC, etc.) and transmit the analog signals or information representative of the converted media content to one or more of the other digital recording/playback devices 128, 130 and 132. The receiving digital recording/playback device(s) 128, 130 and 132 may then convert the received analog signals or information to digital signals that are used for playback and/or recording of the media content.

Each of the metering devices 134, 136 and 138 is configured to monitor the media content received from the broadcast information sources 104 and/or the signal output by a respective one of the digital recording/playback devices 128, 130 and 132 to collect and/or store viewing data (e.g., identifying data such as ancillary codes embedded in and/or signatures extracted from the received media content, time and/or date information associated with the recording and/or the consumption of the received media content, the location at which the received media content is consumed, etc.) In one example, the metering devices 134, 136 and 138 may be configured to detect the emission of analog content from the broadcast information sources 104 and/or the digital recording/playback devices 128, 130 and 132 at a specific frequency. The metering devices 134, 136 and 138 may also be configured to detect the television tuning status of a tuning device disposed in the media delivery devices 122, 124 and 126. Additionally, the metering devices 134, 136 and 138 may extract and/or detect identifying data embedded in or otherwise associated with the media content output by the digital recording/playback devices 128, 130 and 132 and/or the media content received from the broadcast information sources 104. Identifying data such as ancillary codes (e.g., video codes and/or audio codes), watermark data (e.g., video watermarks and/or audio watermarks), metadata, etc. may be embedded in the media content provided by the broadcast information sources 104 and/or output by the digital recording/playback devices 128, 130 and 132. The identifying data may be inserted into the media content during production and/or as the media content is transmitted by a television service provider or the like. Alternatively, the metering devices 134, 136 and 138 may generate or collect identifying data such as signatures (e.g., data characteristics of a signal) from the received media content. The identifying data typically contains information associated with programming contained in the audio and/or video signals such as a title, a source identifier (SID), length information, owner information, time and date information associated with the production, transmission, and/or the encoding of the identifying data, etc.

Each of the metering devices 134, 136 and 138 is configured to detect and/or extract the identifying data embedded in the media content using any known method to extract and/or detect the identifying data. For example, the metering devices 134, 136 and 138 may analyze a vertical blanking interval (VBI) to detect identifying data that may be encoded and/or embedded in the VBI, analyze the video data and/or audio data for watermark data, generate or collect a signature or signatures associated with the audio data and/or video data, etc. The metering devices 134, 136 and 138 may also store the identifying data and/or transmit the identifying data to the data collection unit 118 via the network 102.

The home network media server 112 is coupled to and in communication with the home network media storage database 114. The home network media server 112 is configured to receive media content from one or more of the content storage and viewing sites 106, 108 and 110 via the network 102 and store the received media content in the home network storage database 114. The media content received from the content storage and viewing sites 106, 108 and 110 may be the media content consumed and/or received from the broadcast information sources 104, media content stored on the digital recording/playback devices 128, 130 and 132, or any other media that is available at the content storage and viewing sites 106, 108 and 110. Additionally, the home network media server 112 and the home network media storage database 114 may function as a central repository for all of the media content consumed and/or received via the network 102.

The home network media storage database 114 may store media content in any format, such as a compressed digital format (e.g., an MPEG format) and/or an analog format (e.g., an NTSC format). The home network media server 112 may also distribute the stored media content to any of the content storage and viewing sites 106, 108 and 110 (e.g. to the digital recording/playback devices 128, 130 and 132) by streaming the media content, pushing the media content, allowing the media content to be downloaded or using any other suitable technique. For example, media recorded by digital recording/playback device 128 may be transmitted to the home network media server 112 so that the media is accessible to digital recording/playback devices 130 and 132. In this manner, a household member can, for example, record media content using the digital recording/playback device 128 in content storage and viewing site 106 (e.g., a bedroom). The recorded media content may be conveyed via the network 102 to the media server 112 and stored in the database 114. The media content stored in the database 114 may subsequently be retrieved via the network 102 by the digital recording/playback device 132 to enable another household member or the same household member to view the media content (previously recorded by the digital recording/playback device 128) via the media delivery device 126 in the content storage and viewing site 110 (e.g., a family room).

The home network media server 112 may also be configured to initiate or control communications on the network 102. For example, the home network media server 112 may request media content from any of the content storage and viewing sites 106, 108, and 110. Additionally, the home network media server 112 may direct or enable one of the digital recording/playback devices 128, 130 and 132 to transfer media to another of the digital recording/playback devices 128, 130 and 132 via the network 102.

The space-shift detector 116 is communicatively coupled to the network 102 and configured to determine if media content received at one or more of the content storage and viewing sites 106, 108 and 110 (e.g., media content received by one or more of the media delivery devices 122, 124 and 126) has been space-shifted by one or more of the digital recording/playback devices 128, 130 and 132 and/or the home network media server 112. The space-shift detector 116 may, for example, use software application programming interfaces (APIs) to query the digital recording/playback devices 128, 130 and 132 and/or the home network media server 112 to determine if the media content is space-shifted. The software APIs allow the space-shift detector 116 to determine if a digital recording/playback device (e.g., the device 128) is transferring media content to another digital recording/playback device (e.g., the device 130), if one or more of the digital recording/playback devices 128, 130 and 132 is receiving media content from the home network media server 112, etc. The space-shift detector 116 may additionally or alternatively analyze the raw data stored within the digital recording/playback devices 128, 130 and 132. The space-shift detector 116 may compare the raw data stored on one of the digital recording/playback devices 128, 130 and 132 to the raw data stored on another one of the digital recording playback devices 128, 130 and 132. In this manner the space-shift detector 116 may determine if stored data has been transferred between two or more of the digital recording/playback devices 128, 130 and 132.

The space-shift detector 116 may also be configured to determine if media content is space-shifted by monitoring data accesses to storage devices (e.g., hard drives, flash memory, etc.) associated with each of the digital recording/playback devices 128, 130 and 132 and/or the home network media server 112. The space-shift detector 116 may determine that media has been space-shifted by recognizing when data read from one storage device is subsequently written to another storage device. For example, if the space-shift detector 116 recognizes that data is read from the storage device within the digital recording/playback device 128 and that the same data is written to the storage device within the digital recording/playback device 130, the space-shift detector 116 may notify the data collection unit 118 that the media was space-shifted.

Additionally or alternatively, the space-shift detector 116 may also be configured to determine if media content has been space-shifted by monitoring and analyzing data (e.g., traffic) on the network 102. More specifically, the space-shift detector 116 may function as a data sniffer or monitor and examine data packets transferred via the network 102.

Additionally or alternatively, the space-shift detector 116 may be configured to monitor analog content on the network 102 to determine if media content has been space-shifted. For example, the space-shift detector 116 may be configured to detect content distributed on one or more specific frequencies via analog television signals to thereby detect when media content is sent from one device to another. Such analog television signals may utilize a signal protocol such as, for example, QAM64, QAM256, NTSC, etc. The space-shift detector 116 may also be configured to update the viewing data associated with the space-shifted media content. In particular, the space-shift detector 116 may update the viewing data stored in the data collection unit 118 to include updated time and date information, consumption location, and/or space-shifting source information.

The data collection unit 118 is configured to collect identifying data and/or viewing data collected by the metering devices 134, 136 and 138, and/or by the space-shift detector 116 and to store the collected data. The data collection unit 118 may also allow the viewing data to be read and/or accessed by the space-shift detector 116 and/or the metering devices 134, 136 and 138. The data collection unit 118 may periodically or aperiodically transmit the collected data to the central processing facility 120 via the network 102 or via a different communication link. The data collection unit 118 may use any network communication protocol such as FTP, e-mail, etc. to transmit the collected data to the central processing facility 120. The central processing facility 120 is configured to receive the data collected from the data collection unit 118 and process the received data. The central processing facility 120 may process or analyze the received data to determine audience demographic information, program viewing statistics, advertising viewing statistics, etc.

In some cases, media content and data associated with the media content that is transmitted between the content storage and viewing sites 106, 108, and 110 may be encrypted. In this case, the data may be decrypted before analyzing if sufficient licensing is available (e.g., licensing from a digital recording/playback device manufacturer). If licensing is not available, any unencrypted data associated with the media content (e.g., source address, destination address, etc.) may be used to identify the media content and determine if the media content is space-shifted.

Figure 2:
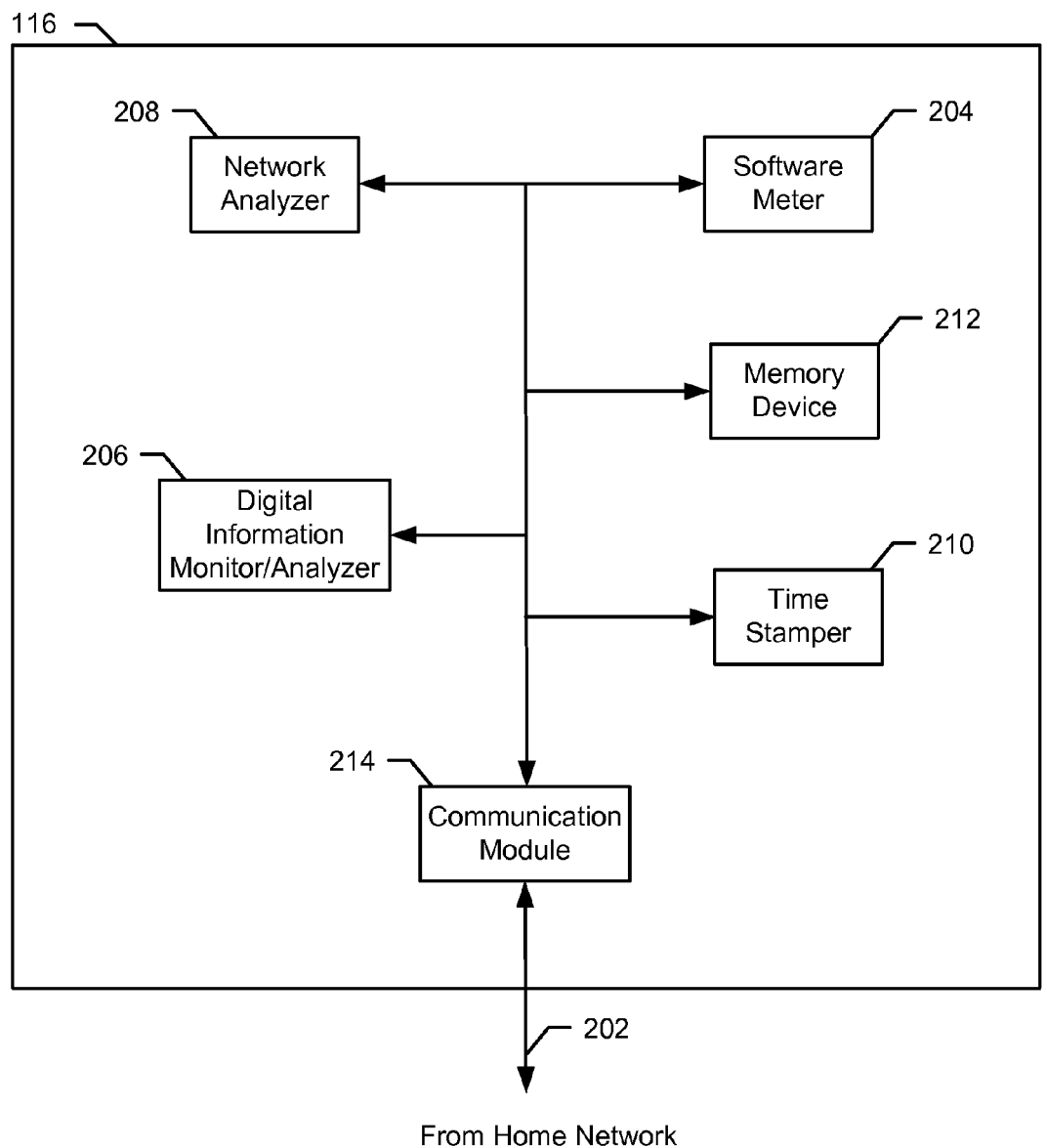
FIG. 2 is a block diagram of an example space-shift detector that may be used to detect space-shifted media content.

FIG. 2 is a block diagram of an example space-shift detector 116 that may be used to detect space-shifted media content. In general, the space-shift detector 116 is configured to monitor the content storage and viewing sites 106, 108 and 110 via the network 102 and to record when media content from one of the content storage and viewing sites 106, 108 and 110 is transferred via the network 102 and consumed (e.g., viewed) at a different one of the content storage and viewing sites 106, 108 and 110. The example space-shift detector 116 may be implemented as several components of hardware, each of which is configured to perform one or more functions, may be implemented in software where one or more software programs are used to perform various functions, or may be implemented using a combination of hardware and software. In this example, the space-shift detector 116 includes a network connection 202, a software meter 204, a digital information monitor/analyzer 206, a network analyzer 208, a time stamper 210, a memory device 212, and a communication module 214.

The network connection 202 may be any type of network connection suitable for use with the network 102. For example, the network 102 may be a wireless network, in which case the network connection 202 is a wireless interface (e.g., Bluetooth wireless technology). A person of ordinary skill in the art will readily appreciate that there are many types of network connections and any of these network connections may be used if they are compatible with the network 102. The network connection 202 also enables the space-shift detector 116 to communicate with other devices (e.g., the digital recording/playback devices 128, 130 and 132, the metering devices 134, 136 and 138, the home network media server 112, the data collection unit 118, etc.) and/or receive media content from other devices.

The software meter 204 is configured to communicate with the digital recording/playback devices 128, 130 and 132 and/or the home network media server 112 and to determine if the received media content is space-shifted. More specifically, the software meter 204 is configured to communicate with the digital recording/playback devices 128, 130 and 132 and/or the home network media server 112 using software APIs. The software APIs may be based on an open API (e.g., an API that is documented and available for public use) and/or a closed API (e.g., an API that is proprietary to the manufacturer and/or designer of the digital recording/playback devices 128, 130 and 132 and/or the home network media server 112). Regardless of the type of software API used, the software meter 204 is configured to use the software APIs to query the digital recording/playback devices 128, 130 and 132 and/or the home network media server 112 to determine if the media content received by the device(s) is space-shifted, to determine a destination and/or a source of the space-shifted media content, etc. If the software meter 204 determines the media content is space-shifted, the software meter 204 may store a value in the memory device 212 to indicate the media content is space-shifted. The value may be of any type such as, for example, a Boolean value (e.g., a bit set to 1 or true when media content is space-shifted). The software meter 204 may also store information associated with the source of the space-shifted media content and/or the destination of the space-shifted media content in the memory device 212 such as a network address, a network identifier, an identifier associated with the content viewing and storage site 104, a serial number associated with the digital recording/playback devices 128, 130 and 132, etc.

Persons of ordinary skill in the art will readily appreciate that if the software meter 204 is unable to determine whether or not the media content is space-shifted, viewing data will still be stored for the viewed media content. Any data that can be extracted from the media content (e.g., embedded codes, signatures, etc.) can be stored at the software meter. This data can be used to track viewing of media content when space-shifting data is not available.

The digital information monitor/analyzer 206 is configured to monitor data accesses to storage devices (e.g., reading data from a storage device and/or writing data to a storage device) associated with each of the digital recording/playback devices 128, 130 and 132 and/or the home network media server 112. The digital information monitor/analyzer 206 may have access to a data bus used to connect the storage devices to other components within the digital recording/playback devices 128, 130 and 132 and/or the home network media server 112. The digital information monitor/analyzer 206 is also configured to analyze data (e.g., media content) written to a first storage device associated with a first one of the digital recording/playback devices 128, 130 and 132 and data read from a second one of the second digital recording/playback devices 128, 130 and 132 and/or the home network media server 112. In particular, the data written to a first storage device may be compared to the data read from a second storage device to determine if the data is identical and/or substantially identical. A bit-wise comparison may be used by the digital information monitor/analyzer 206 to determine if the data accessed by the two digital recording/playback devices are identical, thereby indicating the data (e.g., media content) is space-shifted.

If the digital information monitor/analyzer 206 determines media content is space-shifted, the digital information monitor/analyzer 206 may store a value in the memory device 212 to indicate the media content is space-shifted. The value stored by the digital information monitor/analyzer 206 may be similar to the value stored by the software meter 204. As with the software meter 204, the digital information monitor/analyzer 206 may also store information associated with the source of the space-shifted media content and/or the destination of the space-shifted media content.

The network analyzer 208 is configured to monitor and analyze data associated with the network 102 (e.g., home network traffic). The network analyzer 208 may monitor data transferred or conveyed via the network 102 from one device to another device (e.g., from the home network media server 112 to one or more of the digital recording/playback devices 128, 130 and 132, from one of the digital recording/playback devices 128, 130 and 132 in a first content viewing and storage site to another one of the digital recording/playback devices 128, 130 and 132 in a second content viewing and storage site, etc.) For example, the network analyzer 208 may analyze all, or substantially all, of the data conveyed via the network 102 to determine if the data is of interest to the network analyzer 208 (e.g., data such as video data, audio data, and/or command data). If the data is of interest, the network analyzer 208 may also determine the source network address such as a source internet protocol (IP) address and/or a destination address such as a destination IP address. If the network analyzer 208 determines the source IP address and/or the destination IP address are associated with different ones of the digital recording/playback devices 128, 130 and 132 located in different physical locations within the household 100, the network analyzer 208 may determine the media content is space-shifted. If the network analyzer 208 determines the media content is space-shifted, the network analyzer 208 may store a value in the memory device 212 to indicate the media content is space-shifted. The value stored by the network analyzer 208 may be similar to the value stored by the software meter 204. Similar to the software meter 204, the network analyzer 208 may also store information associated with the source of the space-shifted media content and/or the destination of the space-shifted media content.

The time stamper 210 may be configured to associate a time stamp (e.g., time and/or date information) with the space-shifted media content and/or update the time and/or date information contained in the viewing data associated with the space-shifted media content. For example, the viewing data associated with the space-shifted media content may include time and date information (e.g., one of the metering devices 134, 136 and 138 associated with the source of the space-shifted media content may insert time and date information related to the broadcast time and/or the time at which the media content was received) and the time stamper 210 generates updated time and date information to reflect the time the space-shifted media content is received at the destination digital recording/playback device.

The communication module 214 is configured to transmit and receive data via the network connection 202. The communication module 214 may use any suitable network protocol to transmit and/or receive data. The communication module 214 is also configured to access the viewing data associated with the space-shifted media content stored in the data collection unit 118 and update the viewing data. The viewing data may be updated to include new date and time information from the time stamper 210 and/or an identifier associated with the one of the content viewing and storage sites 106, 108 and 110 that received the space-shifted media content.

The memory device 212 is configured to store values indicating the results of the analyses performed by the software meter 204, the digital information monitor/analyzer 206 and/or the network analyzer 208. The memory device 212 may be any type of memory such as a non-volatile memory device (e.g., flash memory or a hard drive) or a volatile memory device (e.g., random access memory (RAM)).

For the following discussion of FIG. 3, FIG. 4, FIG. 5 and FIG. 6, the content viewing and storage site 106 and its components are referred to, by way of example only, as the destination for space-shifted media content. Of course, one of ordinary skill in the art will recognize that any of the example content storage and viewing sites 106, 108 and 110 may be a destination for space-shifted media content.

Figure 3:
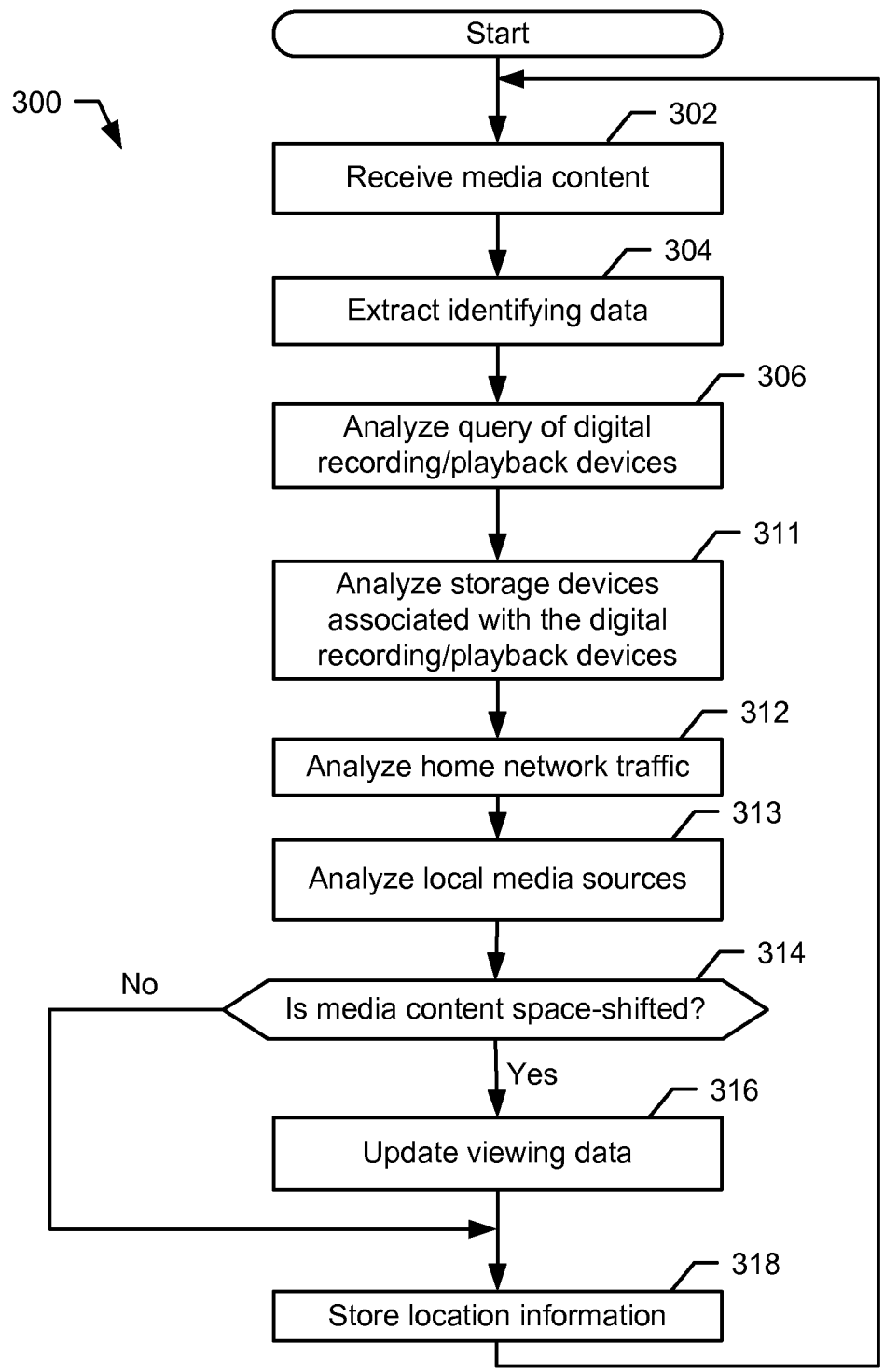
FIG. 3 is a flowchart representative of an example manner in which the apparatus of FIG. 2 may be configured to detect space-shifted media content.

FIG. 3 is a flowchart representative of an example manner in which the apparatus of FIG. 2 may be configured to detect space-shifted media content. As described below, the example space-shift detecting process 300 may be implemented using one or more software programs that are stored in one or more memories such as flash memory, read only memory (ROM), a hard disk, or any other suitable storage device and executed by one or more processors, which may be implemented using microprocessors, microcontrollers, digital signal processors (DSPs) or any other suitable processing device(s). However, some or all of the blocks of the example space-shift detecting process 300 may be performed manually and/or by some other device. Although the example space-shift detecting process 300 is described with reference to the flowchart illustrated in FIG. 3, the order of many of the blocks may be altered, the operation of one or more blocks may be changed, blocks may be combined, and/or blocks may be eliminated.

The example space-shift detecting process 300 begins when media content is received at a content storage and viewing site such as, for example, the content storage and viewing site 106, via the network 102 (block 302). In that case, the content storage and viewing site 106 may be referred to as the destination site. The metering device 134 detects and extracts identifying data from the received media content (block 304). The metering device 134 may detect and/or extract identifying data using any desired method. For example, the metering device 134 may be configured to analyze the VBI to detect and/or extract video and/or audio codes embedded in the media content. The identifying data may contain information such as title information, source identification (SID), time and date information associated with the encoding time, the broadcast time and/or creation time, etc.

After the metering device 134 detects and/or extracts the identifying data (block 304), the space-shift detector 116 queries the digital recording/playback device 128 using software APIs (block 306). If a software API is available, the space-shift detector 116 may request details relating to the media stored on the digital recording/playback device 128. Then, the space-shift detector 116 analyzes the storage device associated with the digital recording/playback device 128 (block 311). Next, the space-shift detector 116 analyzes data transmitted on the network 102 (e.g., home network traffic) (block 312). Then, the metering device 134 may analyze the locally available media sources (block 313). If the metering device 134 determines that the source of the media content is not available at the local viewing site, the media content can be marked as space-shifted because it must have been received from another viewing site that can receive the media source. For example, if the space-shift detector 116 determines that media content at viewing site 106 is from satellite channel 465 and the digital recording/playback device 128 at the viewing site 106 does not have access to a satellite tuner, the space-shift detector 116 can assume that the media content has been space-shifted.

The space-shift detector 116 analyzes the results of blocks 306, 311, 312 and 313 to determine if the media content was space-shifted media content (block 314). If the space-shift detector 116 determines the media content is space-shifted (block 314), the space-shift detector 116 updates viewing data associated with the space-shifted media content stored in the data collection unit 118 (block 316). The viewing data is updated to include updated time and date information associated with the time and/or date at which the space-shifted media content is received at the digital recording/playback device 128. The space-shift detector 116 may update the viewing time by retrieving the viewing data associated with the space-shifted media content stored in the data collection unit 118 and updating the time and date information included in the viewing data. The space-shift detector 116 then updates the viewing data to include the source information (e.g., the device that provided the media content to the viewing site 106) collected at blocks 306, 311 and 312 and/or information associated with the digital recording/playback device 128. Control then returns to block 302.

Persons of ordinary skill in the art will readily appreciate that the metering device 134 may store identifying data without performing analysis of the data. The identifying data may later be compared at the central processing facility 120 with a list of available media sources to determine if the media source associated with the media content was available at the viewing site.

While FIG. 3 illustrates that blocks 304, 306, 311, 312 and 313 are preformed in consecutive order, persons of ordinary skill in the art will recognize that these blocks may be performed in any order and some blocks may be performed at the same time. In addition, not all of the blocks may be necessary and a subset of the blocks may be used. Logic may be implemented to determine if any of blocks 304, 306, 311, 312, or 313 provide a definitive result as to whether the media content has been space-shifted. If a block does definitively indicate that the media content has been space-shifted, control may proceed directly to block 314 after the block. For example, if the space-shift detector 116 queries the digital recording/playback device 128 and digital recording/playback device 128 indicates that the media content is space-shifted, no further analyses need to be performed and control can proceed to block 316.

Figure 4:
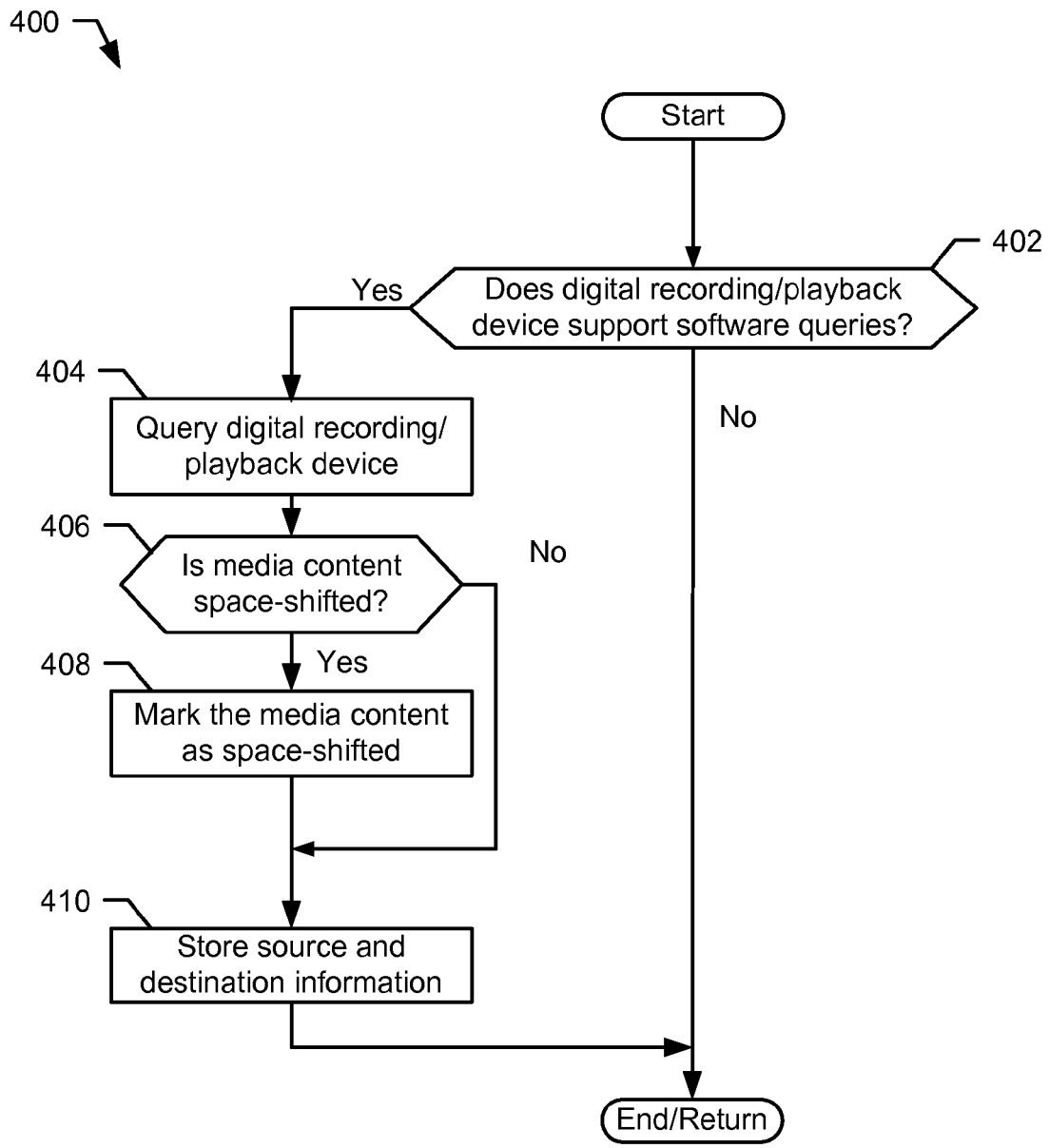
FIG. 4 is a flowchart representative of an example manner in which the process to query and analyze the digital recording/playback devices of FIG. 3 may be implemented.

An example process to query a digital recording/playback device is illustrated in FIG. 4. Continuing with the above example in which the digital recording/playback device 128 is the destination device, the example process 400 begins when the space-shift detector 116 determines if the digital recording/playback device 128 supports software queries (block 402). For example, the space-shift detector 116 may send the digital recording/playback device 128 a message to determine if software queries are supported by the digital recording/playback device 128. If the digital recording/playback device 128 does not acknowledge and/or respond to the message in a predetermined amount of time, the space-shift detector 116 may determine the digital recording/playback device 128 does not support software queries.

Alternatively, the space-shift detector 116 may search a database or list containing information such as manufacturer names and/or model numbers associated with the digital recording/playback device 128 to determine if the digital recording/playback device 128 supports software queries. In any case, if the digital recording/playback device 128 does not support software queries, the example process 400 ends and control returns to, for example, block 311 (FIG. 3).

If the space-shift detector 116 determines software queries are supported at block 402, the space-shift detector 116 queries the digital recording/playback device 128 using software APIs (block 404). For example, the space-shift detector 116 may query the digital recording/playback device 128 to determine if media content received by the digital recording/playback device 128 is from another digital recording/playback device (e.g., one of the digital recording/playback devices 130 and 132) and/or a different content viewing and storage site (e.g., one of the content viewing and storage sites 108 and 110).

If the space-shift detector 116 determines the digital recording/playback device 128 is not receiving media content from another digital recording/playback device or content viewing and storage site (i.e., the media is not space-shifted) (block 406), then control advances to block 410. If the space-shift detector 116 determines the digital recording/playback device 128 is receiving space-shifted media content (block 406), the space-shift detector 116 stores a value in its on-board memory to indicate that the media content has been space-shifted (block 408) and stores information associated with the digital recording/playback device 130 and/or the digital recording/playback device 128 (block 410). The source and/or destination information may include an address or identifier associated with the content viewing and storage site 108 and digital recording/playback device 130 acting as the source and/or an address or identifier associated with the content viewing and storage site 106 and digital recording/playback device 128 acting as the destination.

Figure 5:
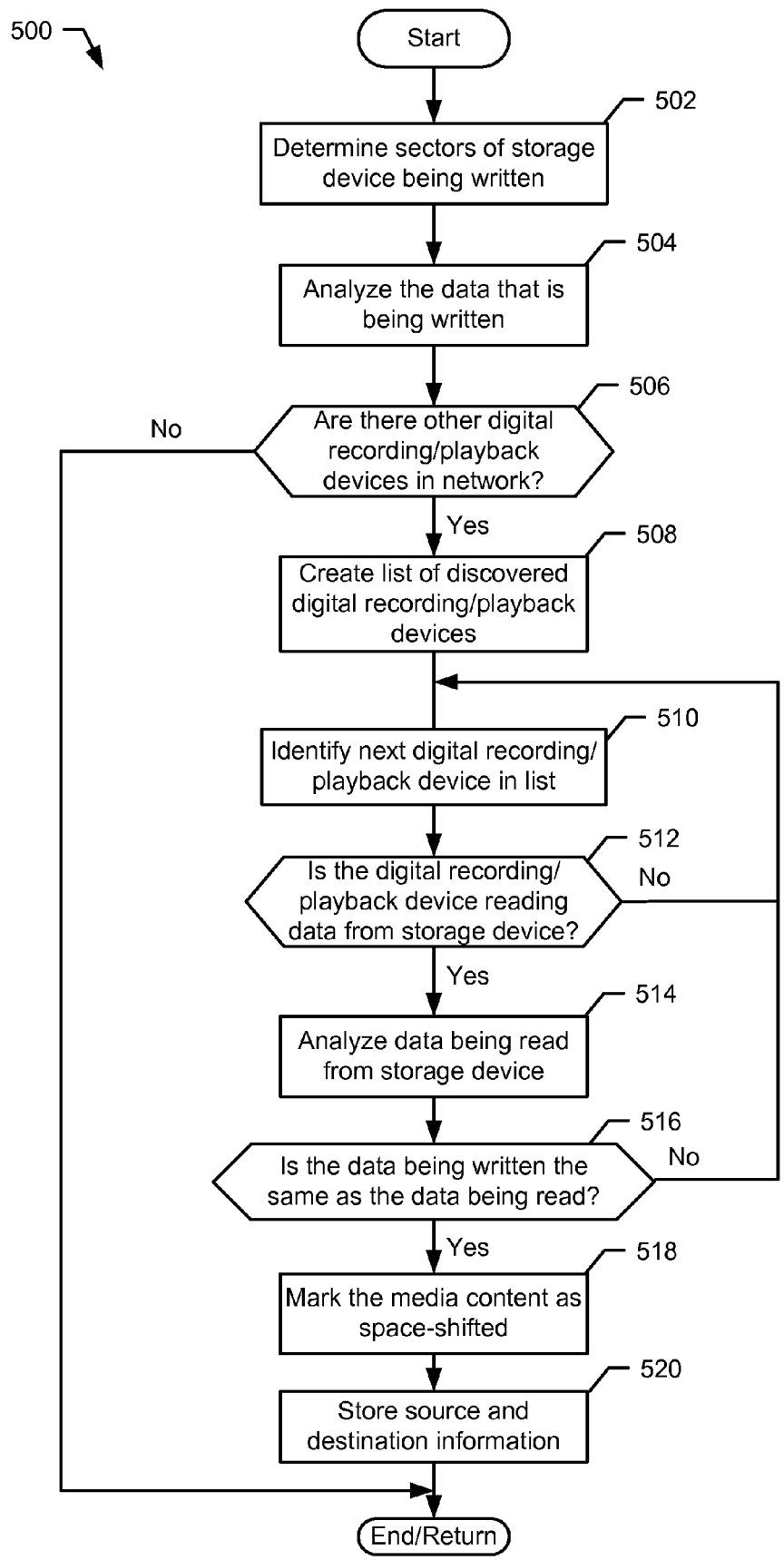
FIG. 5 is a flowchart representative of an example manner in which the process to analyze storage devices associated with digital recording/playback devices of FIG. 3 may be implemented.

An example process to analyze a storage device associated with a content storage and viewing site is illustrated in FIG. 5. The example process 500 begins when the space-shift detector 116 determines the location or areas of the destination storage device where media content is written (e.g., a sector of a hard drive) (block 502). In particular, the space-shift detector 116 may determine the area and/or data address of the storage device at which received media content is stored. Again, continuing with the above example, the space-shift detector 116 may query the storage device associated with the digital recording/playback device 128, query the digital recording/playback device 128, analyze a data bus associated with the digital recording/playback device 128, etc. The space-shift detector 116 then analyzes the data written to the storage device (e.g., write data) (block 504). The data may be analyzed to determine the type of media content written (e.g., a comedy television show encoded in MPEG format) for comparison at a later time (e.g., at block 512).

The space-shift detector 116 then determines if there are other digital recording/playback devices coupled to the network 102 (block 506). For example, the space-shift detector 116 may determine if there are other digital recording/playback devices coupled to the network 102 by scanning the network 102 for other digital recording/playback devices. In another example, the space-shift detector 116 may determine if there are other digital recording/playback devices by broadcasting a message via the network 102 and determining if devices acknowledge the message and provide a response.

If the space-shift detector 116 determines there are no other digital recording/playback devices coupled to the network 102 (block 506), control returns to block 312 of FIG. 3. If the space-shift detector 116 determines there are other digital recording/playback devices coupled to the network 102 (block 506), the space-shift detector 116 creates a list of the discovered digital recording/playback devices coupled to the network 102 (block 508) and then identifies and accesses the next digital recording/playback device in the list (e.g., a source digital recording/playback device) (block 510).

The space-shift detector 116 then determines if the source digital recording/playback device in the list is performing a read operation associated with the storage device of (e.g., a hard drive or other memory within) the digital recording/playback device 130 (e.g., a source storage device) (block 512). For example, the space-shift detector 116 may query the source storage device, query the digital recording/playback device 130, analyze a data bus associated with the digital recording/playback device 130, etc. to determine if the source storage device is performing a read operation. If the data is not being read from the source storage device (block 512), control returns to block 510.

If the data is being read from the source storage device (block 512), the space-shift detector 116 analyzes the data being read from the source storage device (e.g., some media content) (block 514). The space-shift detector 116 compares the read data to the write data collected at block 504 to determine if the read data is identical, or substantially identical, to the write data (block 516). If the read data is not identical or substantially identical to the write data (block 516), control returns to block 510. On the other hand, if the read data is identical or substantially identical to the write data (block 516), the space-shift detector 116 determines the received media content is space-shifted from the digital recording/playback device 130 (which in this example is the source) to the digital recording/playback device 128 (which in this example is the destination). The space-shift detector 116 then stores a value that indicates the received media content is space-shifted media content (block 518) and stores the information associated with the source and/or destination digital recording/playback device 130 and 128 similar to block 410 of FIG. 4 (block 520). Control then returns to block 312 of FIG. 3.

Figure 6:
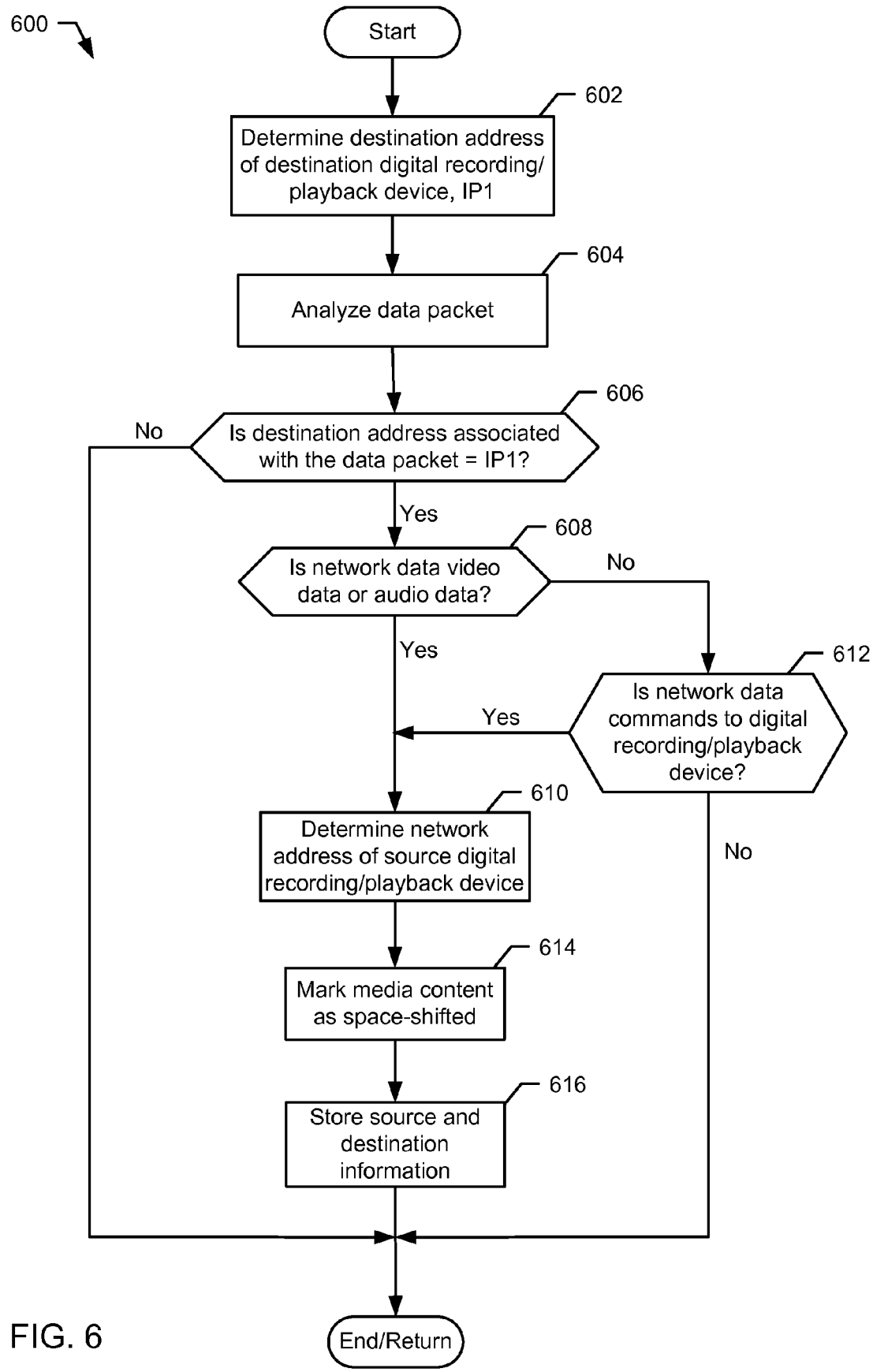
FIG. 6 is a flowchart representative of an example manner in which the process to analyze home network traffic of FIG. 3 may be implemented.

An example process to analyze home network traffic is shown in FIG. 6. The example process 600 begins when the space-shift detector 116 determines a network address associated with a destination digital recording/playback device (e.g., the digital recording/playback device 128) (block 602). For purposes of clarity, the destination address will be referred to as destination address IP1. The space-shift detector 116 may determine the destination address IP1 by analyzing data received by the destination digital recording/playback device via the network 102. For example, the space-shift detector 116 may analyze the received data and determine an IP address contained in the data and determine the IP address is associated with the destination digital recording/playback device.

After the destination address IP1 has been determined (block 602), the space-shift detector 116 analyzes data packets conveyed via the network 102 (block 604). For example, the space-shift detector 116 may analyze the data packets by examining the information contained in the data packets. In particular, the space-shift detector 116 may analyze the data packet(s) and determine if a destination address associated with the data packet(s) is equal to the destination address IP1 (block 606). If the destination address associated with the data packet(s) is not equal to the destination address IP1 (block 606), control returns to block 314 of FIG. 3.

However, if the destination address associated with the data packet is equal to the destination address IP1 (block 606), the space-shift detector 116 determines if the data packet contains video data and/or audio data (block 608). If the data packet contains video data and/or audio data (block 608), the space-shift detector 116 analyzes the data packet to determine a source address associated with the data packet (block 610). The space-shift detector 116 may determine the source digital recording/playback device by determining the source address associated with the data packet.

If the data packet does not contain video data and/or audio data (block 608), the space-shift detector 116 determines if the data packet contains command data associated with a digital recording/playback device (block 612). If the data packet does not contain command data associated with a digital recording/playback device (block 612), control advances to block 314 of FIG. 3. If the data packet does contain command data associated with a digital recording/playback device, control advances to block 610 and the space-shift detector 116 determines the source address associated with the data packet.

After the space-shift detector 116 determines the source address associated with the data packet (block 610), the space-shift detector 116 stores a value that indicates the received media content associated with the data packet is space-shifted media content (block 614). The space-shift detector 116 also stores information associated with the source digital recording/playback device and/or the destination digital recording/playback device similar to the information stored in block 410 of FIG. 4 (block 616) and then returns to block 314 of FIG. 3.

Figure 7:
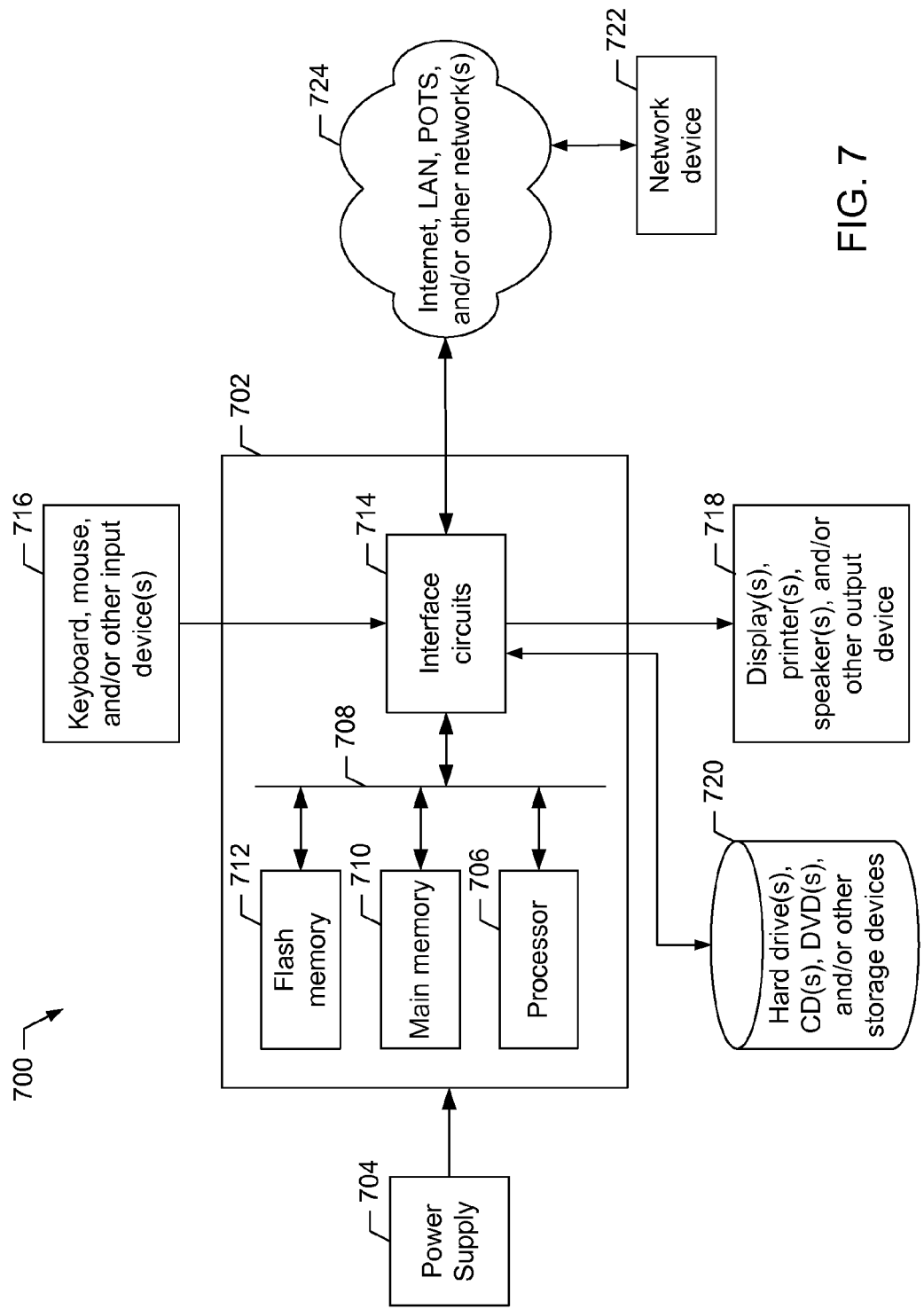
FIG. 7 is a block diagram of a processor-based system that may be used to implement the example apparatus and methods disclosed herein.

A block diagram of an example computer system 700 is illustrated in FIG. 7. The computer system 700 may be a personal computer (PC) or any other computing device. In the example illustrated, the computer system 700 includes a main processing unit 702 powered by a power supply 704. The main processing unit 702 may include a processor 706 electrically coupled by a system interconnect 708 to a main memory device 710, a flash memory device 712, and one or more interface circuits 714. In an example, the system interconnect 708 is an address/data bus. Of course, a person of ordinary skill in the art will readily appreciate that interconnects other than busses may be used to connect the processor 706 to the other devices 710-714. For example, one or more dedicated lines and/or a crossbar may be used to connect the processor 706 to the other devices 710-714.

The processor 706 may be any type of well known processor, such as a processor from the Intel Pentium® family of microprocessors, the Intel Itanium® family of microprocessors, the Intel Centrino® family of microprocessors, and/or the Intel XScale® family of microprocessors. In addition, the processor 706 may include any type of well known cache memory, such as static random access memory (SRAM). The main memory device 710 may include dynamic random access memory (DRAM) and/or any other form of random access memory. For example, the main memory device 710 may include double data rate random access memory (DDRAM). The main memory device 710 may also include non-volatile memory. In an example, the main memory device 710 stores a software program which is executed by the processor 706 in a well known manner. The flash memory device 712 may be any type of flash memory device. The flash memory device 712 may store firmware used to boot the computer system 700.

The interface circuit(s) 714 may be implemented using any type of well known interface standard, such as an Ethernet interface and/or a Universal Serial Bus (USB) interface. One or more input devices 716 may be connected to the interface circuits 714 for entering data and commands into the main processing unit 702. For example, an input device 716 may be a keyboard, mouse, touch screen, track pad, track ball, isopoint, and/or a voice recognition system.

One or more displays, printers, speakers, and/or other output devices 718 may also be connected to the main processing unit 702 via one or more of the interface circuits 714. The display 718 may be a cathode ray tube (CRT), a liquid crystal displays (LCD), or any other type of display. The display 718 may generate visual indications of data generated during operation of the main processing unit 702. The visual indications may include prompts for human operator input, calculated values, detected data, etc. As described in detail below, these displays may be generated by firmware in a pre-boot environment. In addition, text strings used on these pre-boot displays may be in a user selected language.

The computer system 700 may also include one or more storage devices 720. For example, the computer system 700 may include one or more hard drives, a compact disk (CD) drive, a digital versatile disk drive (DVD), and/or other computer media input/output (I/O) devices. In addition to the text strings stored in the flash memory device 712 (if any), one or more storage devices 720 (e.g., a hard disk) may store text strings in one or more languages.

The computer system 700 may also exchange data with other devices 722 via a connection to a network 724. The network connection may be any type of network connection, such as an Ethernet connection, digital subscriber line (DSL), telephone line, coaxial cable, etc. The network 724 may be any type of network, such as the Internet, a telephone network, a cable network, and/or a wireless network. The network devices 722 may be any type of network devices 722. For example, the network device 722 may be a client, a server, a hard drive, etc.

Although the following discloses example systems, including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the following describes example systems, persons of ordinary skill in the art will readily appreciate that the examples are not the only way to implement such systems.

Although certain methods, apparatus, and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A method to identify space-shifted media, the method comprising:
   detecting, by executing an instruction with a processor, a data packet transmitted from a first media playback device of a home network to a second media playback device of the home network;
   determining, by executing an instruction with the processor, that media associated with the data packet is space-shifted when the data packet includes at least one of media data or command data; and
   updating, by executing an instruction with the processor, viewing data associated with the media to indicate that the second media playback device is a location of consumption of the media.

2. The method as defined in claim 1, further including:
   identifying a source address in the data packet, the source address identifying the first media device,
   wherein the determining that the media is space-shifted includes indicating that the media associated with the data packet was space-shifted from the first media playback device to the second media playback device.

3. The method as defined in claim 1, further including:
   identifying a source address in the data packet, the source address identifying the second media playback device, and
   wherein the determining that the media is space-shifted includes indicating that the media associated with the data packet was space shifted from the second media playback device to the first media playback device.

4. The method as defined in claim 1, further including:
   identifying a source address of the data packet, the source address identifying the first media playback device; and
   identifying a destination address of the data packet, the destination address identifying the second media playback device.

5. The method as defined in claim 4, further including sending to a data collection facility, an indication that the media was space-shifted from the first media playback device to the second media playback device.

6. The method as defined in claim 1, further including:
   identifying time-shift tricks from the command data, the time-shift tricks including at least one of pausing media, fast-forwarding media, rewinding media, or slow motion viewing of media.

7. The method as defined in claim 1, wherein the determining that the media associated with the data packet is space-shifted further includes detecting media distributed on one or more frequencies via analog television signals.

8. A router comprising:
   a processor;
   a network analyzer to detect a data packet transmitted from a first media playback device of a home network to a second media playback device of the home network; and
   a space shift detector to:
      determine that media associated with the data packet is space-shifted when the data packet includes at least one of media data or command data; and
      update viewing data associated with the media to indicate that the second media playback device is a location of consumption of the media.

9. The router as defined in claim 8, wherein the space-shift detector is further to:
   identify a source address in the data packet, the source address identifying the first media playback device; and
   indicate that the media associated with the data packet was space-shifted from the first media playback device to the second media playback device.

10. The router as defined in claim 8, wherein the space-shift detector is further to:
    identify a source address in the data packet, the source address identifying the second media playback device; and indicate that the media associated with the data packet was space-shifted from the second media playback device to the first media playback device.

11. The router as defined in claim 8, wherein the network analyzer is to detect the data packet by:
   identifying a source address of the data packet, the source address identifying the first media playback device; and
   identifying a destination address of the data packet, the destination address identifying the second media playback device.

12. The router as defined in claim 8, wherein the command data includes data to control playback of the media.

13. The router as defined in claim 8, wherein the space-shift detector is further to identify time-shift tricks from the command data, the time-shift tricks including at least one of pausing media, fast-forwarding media, rewinding media, or slow motion viewing of media.

14. The router as defined in claim 8, wherein the space shift detector is to determine that the media associated with the data packet is space-shifted by detecting media distributed via analog television signals.

15. A tangible computer readable storage device or storage disc comprising instructions that, when executed cause a machine to at least:
   detect a data packet transmitted from a first media playback device of a home network to a second media playback device of the home network;
   determine that media associated with the data packet is space-shifted when the data packet includes at least one of media data or command data; and
   update viewing data associated with the media to indicate that the second media playback device is a location of consumption of the media.

16. The storage device or storage disc as defined in claim 15, wherein the instructions, when executed further cause the machine to:
   identify a source address in the data packet, the source address identifying the first media playback device; and
   indicate that the media associated with the data packet was space-shifted from the first media playback device to the second media playback device.

17. The storage device or storage disc as defined in claim 15, wherein the instructions, when executed further cause the machine to:
   identify a source address in the data packet, the source address identifying the second media playback device, and
   indicate that the media associated with the data packet was space shifted from the second media playback device to the first media playback device.

18. The storage device or storage disc as defined in claim 15, wherein the instructions, when executed further cause the machine to:
   identify a source address of the data packet, the source address identifying the first media playback device; and
   identify a destination address of the data packet, the destination address identifying the second media playback device.

19. The storage device or storage disc as defined in claim 15, wherein the command data includes data to control playback of the media.

20. The storage device or storage disc as defined in claim 15, wherein the instructions, when executed, further cause the machine to identify time-shift tricks from the command data, the time-shift tricks including at least one of pausing media, fast-forwarding media, rewinding media, or slow motion viewing of media.

* * * * *